(12) United States Patent
Noble (10) Patent No.: US 11,551,202 B1
(45) Date of Patent: *Jan. 10, 2023

(54) CARD PRESENT ONBOARDING-UTILITY

(71) Applicant: Stripe, Inc., San Francisco, CA (US)

(72) Inventor: Steven Henry Noble, Berkeley, CA (US)

(73) Assignee: STRIPE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/542,107

(22) Filed: Aug. 15, 2019

Related U.S. Application Data (63) Continuation of application No. 15/239,736, filed on Aug. 17, 2016, now Pat. No. 10,395,241.

(51) Int. Cl.
*G06Q 40/00* (2012.01)
*G06Q 20/36* (2012.01)
*G06Q 20/32* (2012.01)
*G06Q 20/34* (2012.01)

(52) U.S. Cl.
CPC ......... *G06Q 20/363* (2013.01); *G06Q 20/322* (2013.01); *G06Q 20/354* (2013.01); *G06Q 20/3563* (2013.01); *G06Q 20/3672* (2013.01)

(58) Field of Classification Search
CPC ............. G06Q 20/363; G06Q 20/3563; G06Q 20/322; G06Q 20/3672; G06Q 20/354
USPC ...... 705/27.1, 65, 35–45; 717/178; 713/153; 719/320; 726/7; 455/418
See application file for complete search history.

(56) References Cited

U.S. PATENT DOCUMENTS

| | | | |
|---|---|---|---|
| 2006/0058015 A1* | 3/2006 | Nakamura | H04L 63/10 455/418 |
| 2010/0146500 A1* | 6/2010 | Joubert | G06F 8/61 717/178 |
| 2012/0116925 A1* | 5/2012 | Jamkhedkar | G06Q 30/00 705/27.1 |

(Continued)

OTHER PUBLICATIONS

Google Scholar Search, dated May 13, 2022. (Year: 2022).*
Google Patents Search, dated May 13, 2022. (Year: 2022).*

*Primary Examiner* — Hai Tran
(74) *Attorney, Agent, or Firm* — Womble Bond Dickinson (US) LLP (57) ABSTRACT

Method to generate onboarding flow for application starts with on-boarding server receiving request from electronic device to activate application. On-boarding server determines whether request is initial request. Request is determined to be initial request when minimal set of information associated with user is not stored in on-boarding server. When request is determined to be initial request, on-boarding server signals to electronic device to display request for minimal set of information associated with user which includes at least one of: user identification, legal name, phone number, or email address. Minimal set of information associated with user is then received and stored in on-boarding server. On-boarding server signals to allow initial access to application. Signaling to allow initial access includes signaling that user requires access to payment processing hardware to process user's physical payment instrument. On-boarding server receives default payment information entered using payment processing hardware. Other embodiments are also described.

22 Claims, 7 Drawing Sheets

(56) References Cited

U.S. PATENT DOCUMENTS

| | | | |
|---|---|---|---|
| 2013/0091351 A1* | 4/2013 | Manges | H04L 9/14 713/153 |
| 2014/0259134 A1* | 9/2014 | Scavo | H04L 67/141 726/7 |
| 2016/0055014 A1* | 2/2016 | Gallimore | G06F 9/44521 719/320 |
| 2016/0148177 A1* | 5/2016 | Best | G06Q 20/023 705/65 |

* cited by examiner

CARD PRESENT ONBOARDING-UTILITY

CROSS-REFERENCE TO RELATED APPLICATIONS

This application is a continuation of U.S. patent application Ser. No. 15/239,736, filed on Aug. 17, 2016, the disclosure of which is incorporated herein by reference in its entirety.

FIELD

Embodiments of the present disclosure relate generally to a system and method to generate an onboarding flow for an application. Specifically, the onboarding flow allows for the user to initially access the application without providing payment information and obtains the payment information using payment processing hardware that coupled with a provider's electronic device.

BACKGROUND

Currently, a number of applications that provide a service may be downloaded onto consumer electronic devices. For example, these applications include ridesharing applications like Uber™ and Lyft™, laundry and dry cleaning applications like Washio™, grocery delivery applications like Instacart™, etc. When signing up for these applications, the on-boarding process of the application requires the user to enter payment information before allowing the user to use the service it provides.

It has been shown that the request for the user's payment information at this stage of the on-boarding process is often an obstacle or a deterrent to potential users to finalize their signing up for the application. Further, when the user's enters their credit card payment information via the application, the interchange rate is higher because the user's card is considered to a card-not-present when it is charged.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

The present disclosure relates generally to systems and methods for generating an onboarding flow for an application. In embodiments of the inventions, the onboarding flow addresses the deterrent that requesting the user for his payment information at the onset of the flow poses to the signing up of the application. Further, the onboarding flow in embodiments of the invention also allows for the application service provider and/or the on-boarding service provider to be charged lower card-present interchange rates.

Figure 1:
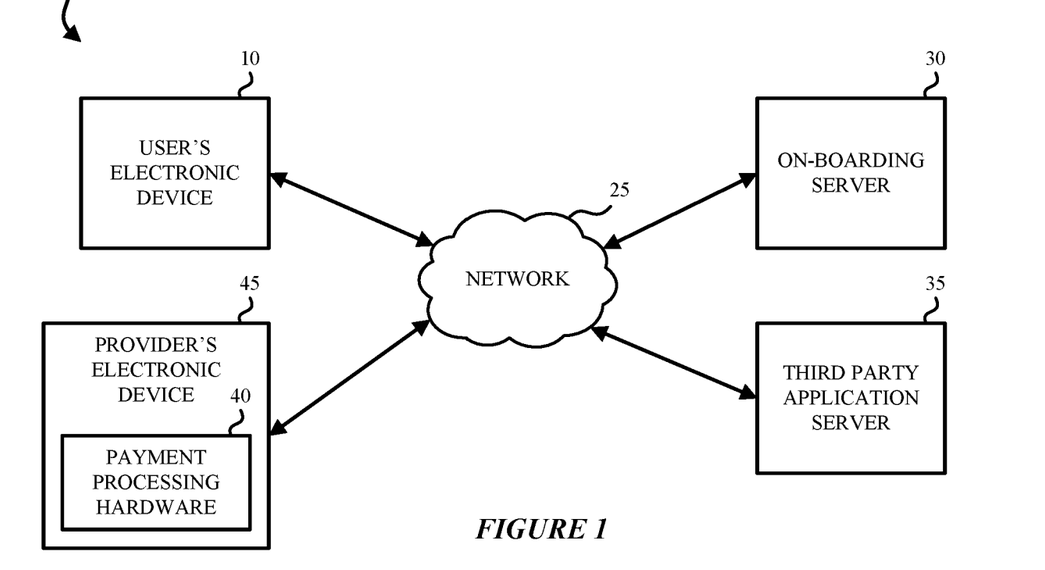
FIG. 1 illustrates a block diagram of a system for generating an onboarding flow for an application according to an embodiment.

FIG. 1 illustrates a block diagram of a system for generating an onboarding flow for an application according to an embodiment. The system 100 is a networked system that includes a user's electronic device 10, a provider's electronic device 45, a third party application server 35 and an on-boarding server 30 coupled via a trusted and/or untrusted network 25. The network 25 may be physically located in a secure location to be trusted or may be trusted according to secure connections based on cryptographic protocols, e.g., SSL (Secure Socket Layer), PVN (Private Virtual Networking), or other connections. The network 25 may be a cellular mobile phone network (e.g. a Global System for Mobile communications, GSM, network), including current 2G, 3G, 4G, LTE networks and their associated call and data protocols; and an IEEE 802.11 data network (WiFi or Wireless Local Area Network, WLAN). It is understood that the system 100 may include a plurality of mobile devices 10, a plurality of provider's electronic device 45, and a plurality of third party application server 35.

The user's electronic device 10 may be a mobile device or a stationary device. For example, the user's electronic device 10 may be in the form of a computer, a handheld portable electronic device such as a cellular phone, a mobile device, a personal data organizer, a computing device having a tablet-style form factor, etc. A third-party application may be downloaded from the third-party application server 35 on the user's electronic device 10. The third-party application may be an application that provides services. For example, the third-party application may be a ridesharing application like Uber™ or Lyft™, a laundry and dry cleaning application like Washio™, a grocery delivery applications like Instacart™, etc.

The provider's electronic device 45 may also be a mobile device or a stationary device that is running the service provider's version of the third-party application. In the ride sharing application example, the provider's electronic device 45 is the driver's mobile device that is running the ridesharing application in driver mode. As shown in FIG. 1, the provider's electronic device 45 may include a payment processing hardware 40. In some embodiments, the physical payment instrument is a card, and the payment processing hardware 40 is a hardware that allows for payment to be processed via swiping the magnetic stripe on the user's physical payment instrument or via inserting the chip on the user's physical payment instrument. One example of the payment processing hardware 40 is the Square™ card reader that may be coupled to a provider's electronic device 45. In other embodiments, the physical payment instrument includes a radio-frequency identification (RFID) chip or a near-field communication (NFC) chip to allow for contactless payment using the physical payment instrument and the payment processing hardware 40. While not shown, it is understood that the system 100 may also include a plurality of provider's electronic devices 45 and some of the provider's electronic devices 45 in the system 100 may not include the payment processing hardware 40.

Figure 2:
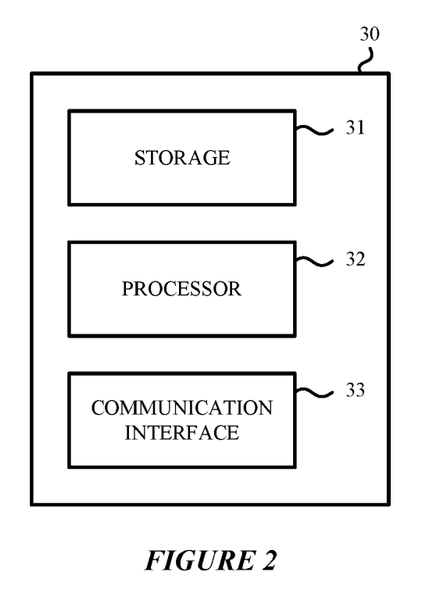
FIG. 2 illustrates a block diagram of the details of the on-boarding server included in the system in FIG. 1 for generating an onboarding flow for an application according to one embodiment.

The on-boarding server 30 generates and processes the onboarding flow for the third party application that is executing on the user's electronic device 10. While FIG. 1 illustrates the on-boarding server 30 as separate from the third party application server 35, in some embodiments, the on-boarding server 30 may be included in the third party application server 35. FIG. 2 illustrates a block diagram of the details of the on-boarding server 30 included in the system 100 in FIG. 1 for generating an onboarding flow for an application according to one embodiment. The on-boarding server 30 may include a storage 31, a processor 32, and communication interface 33.

The communication interface 32 may be an interface that is coupled to the network 25 in order to receive information and transmit information. The storage 31 may be coupled to the communication interface 32 and stores, for example, information associated with the users of the third-party application such as a user identification, a legal name, a phone number, an email address, social network access information, home address, and telephone number. The storage 31 may also store, for example, payment information associated with the users such as payment card number, expiration date of the payment card, user's billing address, etc. The storage 31 may include one or more different types of storage such as hard disk drive storage, nonvolatile memory, and volatile memory such as dynamic random access memory.

The processor 33 may be coupled to the communication interface 32 and the storage 31. The processor 33 may be a microprocessor, a microcontroller, a digital signal processor, or a central processing unit. The term "processor" may refer to a device having two or more processing units or elements, e.g. a CPU with multiple processing cores. The processor 33 may be used to control the operations of on-boarding server 30 by executing software instructions or code stored in the storage 31.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 3:
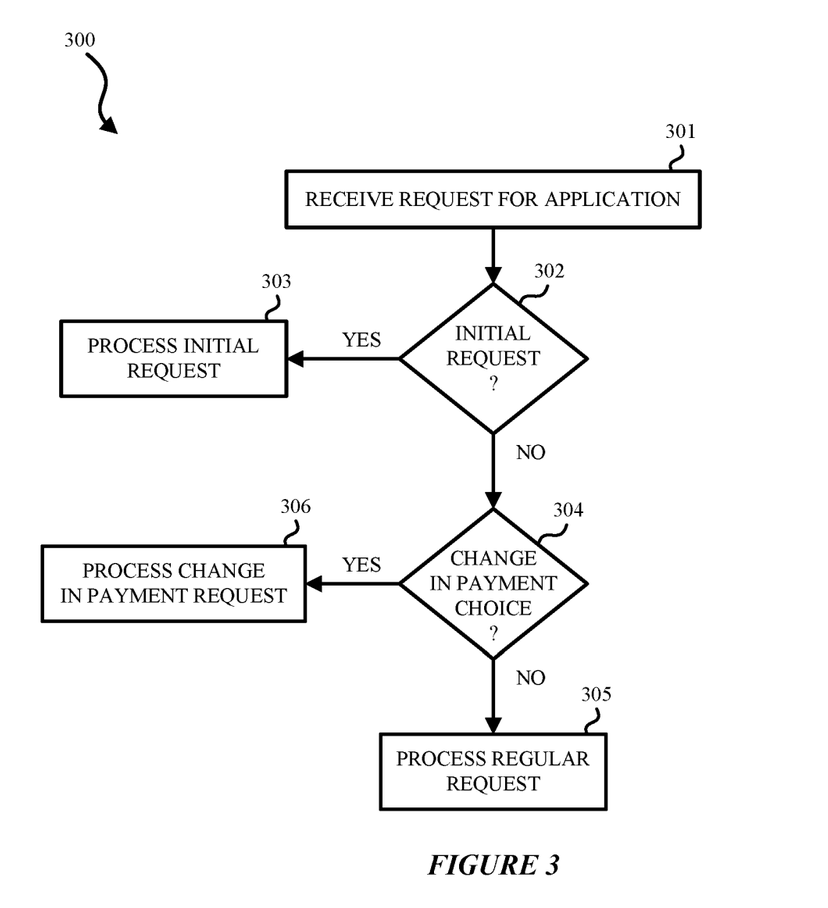
FIG. 3 illustrates a flow diagram of an example method for generating an onboarding flow for an application according to one embodiment.

FIG. 3 illustrates a flow diagram of an example method for generating an onboarding flow for an application according to one embodiment. The method 300 starts with the on-boarding server 30 receiving a request from a user's electronic device 10 to activate an application (Block 301). The user's electronic device 10 is associated with a user.

At Block 302, the on-boarding server 30 determines whether the request is an initial request. In one embodiment, the on-boarding server 30 determines that a request is an initial request when a minimal set of information associated with the user is not stored in the on-boarding server 30. Accordingly, the on-boarding server 30 can determine that the application is newly installed on the user's electronic device 10 because the minimal set of information on the user is not known. The minimal set of information may include, for example, a user identification, a device identification, a legal name, a phone number, or an email address.

Figure 4:
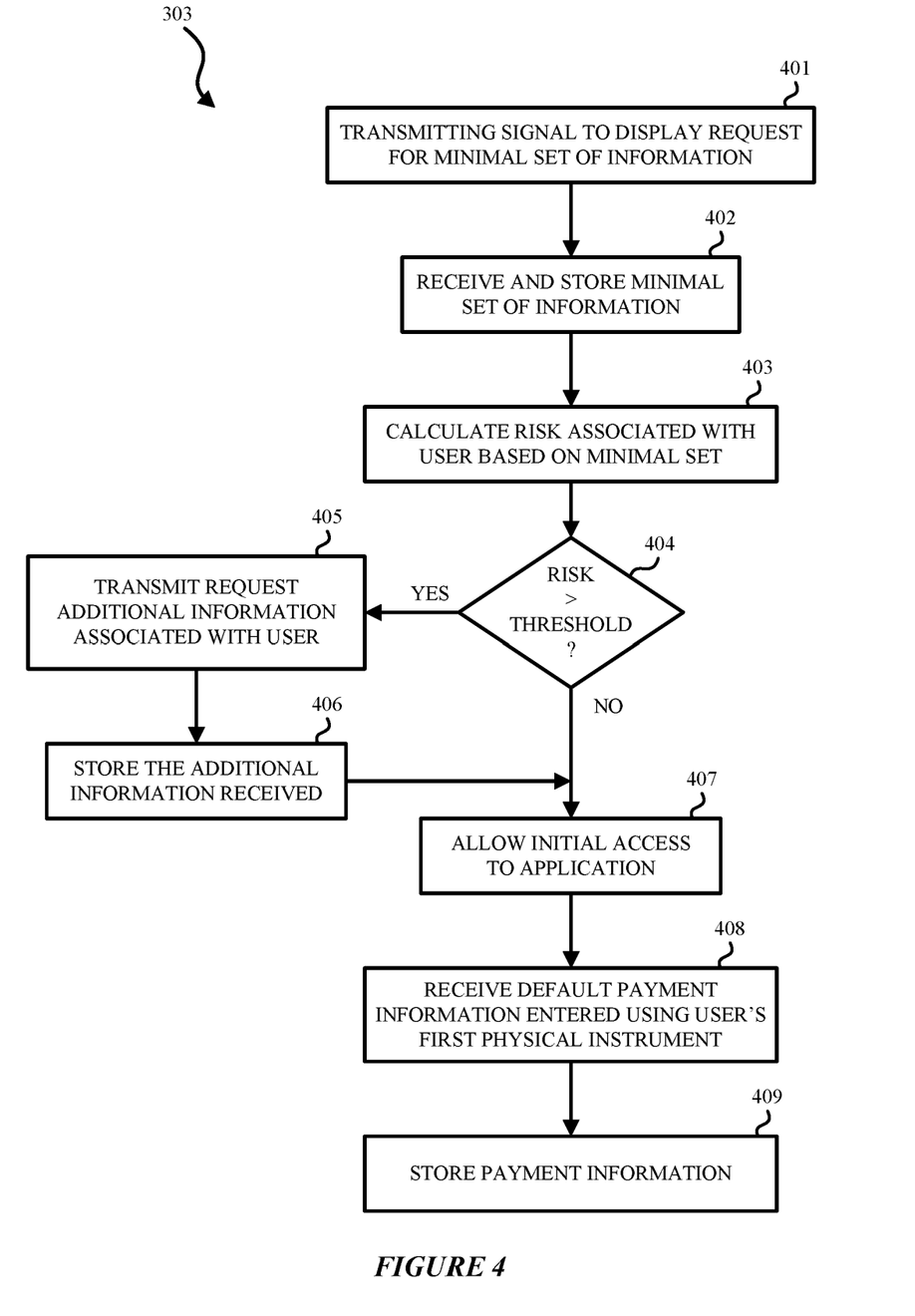
FIG. 4 illustrates a flow diagram of an example method for the processing of an initial request step 303 in the method in FIG. 3 for generating an onboarding flow for an application according to one embodiment.

If it is determined at Block 302 that this is an initial request, the on-boarding server 30 processes the initial request at Block 303. FIG. 4 illustrates a flow diagram of an example method for the processing of an initial request step 303 in the method in FIG. 3 for generating an onboarding flow for an application according to one embodiment.

Figure 9:
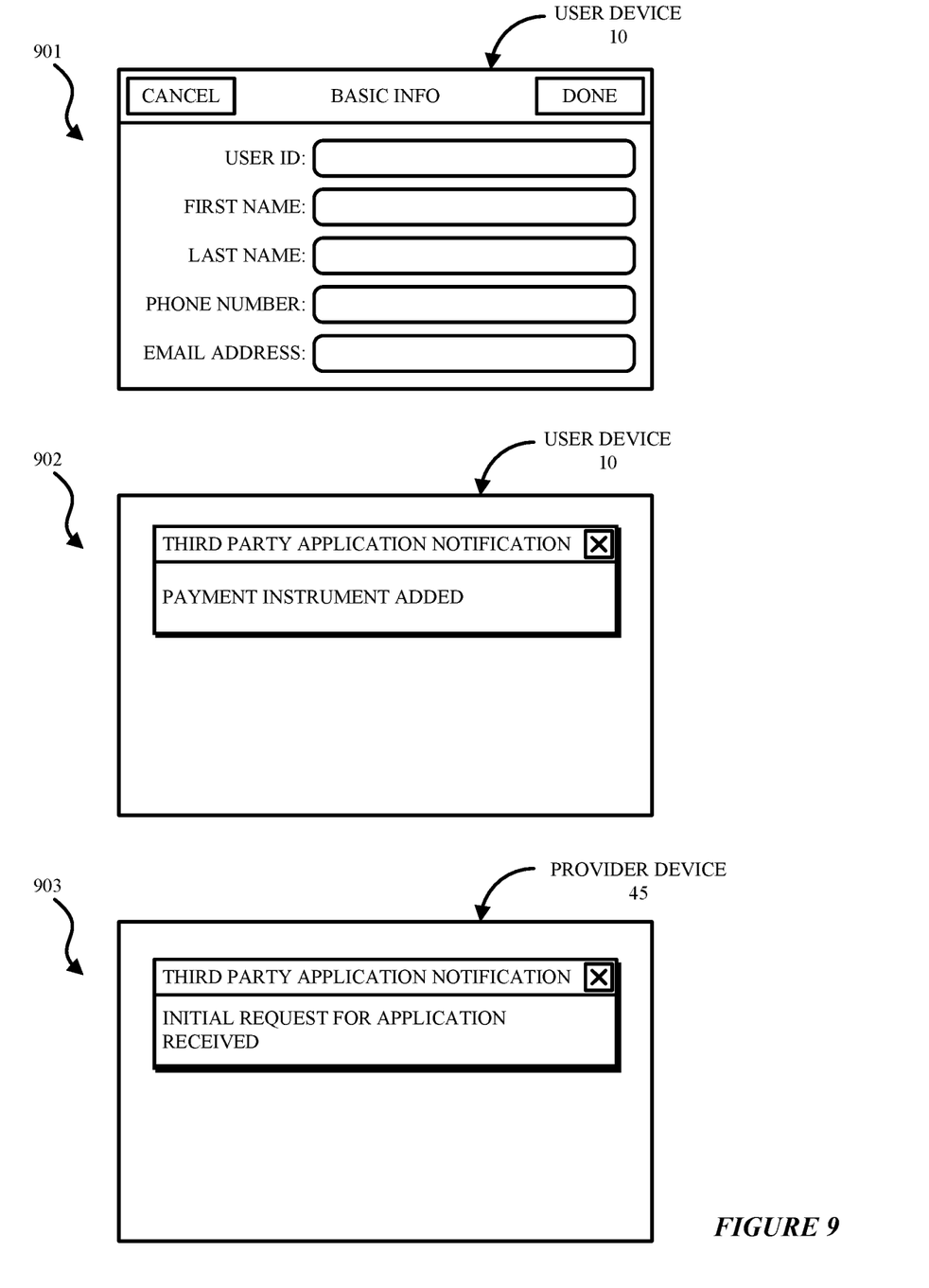
FIG. 9 illustrates exemplary user interface displays on the user device and on the provider device according to one embodiment.

When the request is determined to be the initial request, the on-boarding server 30 transmits a signal (or signals) to the user's electronic device 10 to display a request for the minimal set of information associated with the user at Block 401. Referring to FIG. 9, user interface display 901 illustrates an example of the displayed requested for the minimal set of information on the user's electronic device 10. At Block 402, the on-boarding server 30 receives and stores the minimal set of information associated with the user in the storage 31.

At Block 403, the on-boarding server 30 calculates a risk associated with the user based on the minimal set of information. At Block 404, the on-boarding server 30 compares the risk calculated in Block 403 to a predetermined threshold. When the risk associated with the user is greater than a predetermined threshold at Block 404, the on-boarding server 30 signals to the user's electronic device 10 to display a request for additional information associated with the user at Block 405. For example, the additional information associated with the user includes social network access information, home address, telephone number, or payment information.

In one embodiment, the on-boarding server 30 calculates a risk associated with the user is based on information processed in the user's initial access to the application. Using this information, the on-boarding server 30 may calculate the risk of the user being unable or unwilling to provide his physical payment instrument at the completion of the service as a form of payment (e.g., freeriding). For example, in the ridesharing application example, the information processed in the user's initial access to the application may include the starting location or the destination entered when the ride or trip is ordered, the distance of the ride, the expected cost of the ride, the frequency with which this path is taken by other users, the frequency at which other users have attempted to freeride on this path, etc. In one embodiment, the information processed in the user's initial access to the application may be a contextual information related to the user's initial access to the application. Contextual information may include, for example, the time of day, the type of service requested, whether the prices are surging (e.g., increasing due to high demand), etc.

In one embodiment, the on-boarding server 30 calculates a risk associated with the user based on information associated with the user's electronic device 10. For example, the information associated with the user's electronic device 10 includes at least one of: a brand, a carrier, a unique identification number (UID), a globally unique identifier (GUID), applications installed on the electronic device, previous purchases made using the electronic devices, and whether the electronic device is rooted.

Referring back to FIG. 4, at Block 406, the on-boarding server stores the additional information received at Block 405 in the storage 31. When the risk is determined to not be greater than the threshold at Block 404 or once the additional information associated with the user is stored at Block 406, the on-boarding server 30 signals to allow initial access to the application at Block 407. In one embodiment, the on-boarding server 30 signals to allow initial access by signaling that the user requires access to payment processing hardware to process a user's physical payment instrument. In one embodiment, the on-boarding server 30 may signal to the third-party application server 35 or to the user's electronic device 10 that the user requires access to payment processing hardware. In one embodiment, the payment processing hardware 40 is included on a provider's electronic device 45 and used to process at least one of a chip or magnetic stripe on the user's first physical payment instrument. For example, in the ridesharing application, when the ridesharing application server 35 or the application on the user's electronic device 10 receives the signal that the user requires access to payment processing hardware, the ridesharing application may only display available drivers that have the payment processing hardware 40 included on their provider's electronic device 45. For example, in FIG. 9, the user interface display 903 is an exemplary display of a notification on the provider's electronic device 45 that an initial request for the application is received. In the ridesharing application example, the provider's electronic device 45 that includes the payment processing hardware 40 may receive this notification in user interface display 903 to indicate that the user requires access to the payment processing hardware 40. Accordingly, the user that requires the payment processing hardware 40 to process his physical payment instrument is ensured to be paired with providers that have the required hardware on their provider's electronic device 45.

Having initial access to the application at Block 407, the user is able to request the service associated with the application from a provider who has access to payment processing hardware 40 on their provider's electronic device 45. The user is thus able to pay for the service by using his physical payment instrument with the payment processing hardware 40. The payment information associated with the user's physical payment instrument is a default payment information. The default payment information may include the payment card number, payment card expiration number, billing address associated with the payment card, etc. The user may be required to pay for the service by using his physical payment card with the payment processing hardware 40 before the service is begun (e.g., at the beginning of the ride in the ridesharing application, before the laundry provider takes the user's laundry, etc.) or at the completion of the service (e.g., once the user is at the destination in the ridesharing application, once the laundry is returned clean, etc.).

At Block 408, the on-boarding server 30 receives the default payment information entered using the payment processing hardware 40 to process a user's first physical payment instrument and at Block 409, the on-boarding server 30 stores the default payment information in the storage 31. Referring to FIG. 9, the user's electronic device 10 may display the user interface display 902 which includes a notification from the third-party application that the default payment instrument has been added to the application. In one embodiment, once the default payment information that is entered using the payment processing hardware 40 is received, the on-boarding server 30 determines whether the default payment information has previously been associated with an authorization to complete automatic on-boarding for the application using previously stored user personal information on the on-boarding server 30. For example, the user may have authorized automatic on-boarding during an on-boarding of a previous application that was downloaded on the user's electronic device 10. During the on-boarding of the previous application, the information associated with the user (including the minimal set of information as well as the additional information) may have been stored in the on-boarding server 30's storage 31. If automatic on-boarding is authorized, the on-boarding server 30 may auto-complete the on-boarding of subsequent applications using the information associated with the user stored in the on-boarding server 30's storage 31. In some embodiments, the on-boarding server 30 may transmit a one-time use code to the telephone number or email that associated with the user and stored in the on-boarding server 30's storage 31 to verify the user's identity prior to auto-completing the on-boarding of the application.

Referring back to FIG. 3, if at Block 302, the on-boarding server 30 determines that the request is not an initial request, at Block 304, the on-boarding server 30 determines whether there is request for a change in payment choice. For example, a user may have a personal payment instrument stored as a default payment information and now wishes to use a different payment instrument (e.g., a business payment card). In one embodiment, the user's electronic device 10 may signal to the on-boarding server 30 that a change in payment choice is requested by the user. The user may indicate this request via the user's electronic device 10's user interface.

Figure 5:
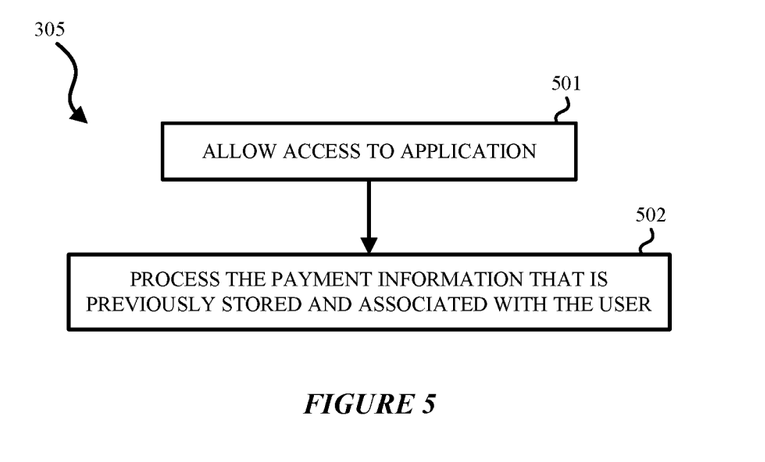
FIG. 5 illustrates a flow diagram of an example method for the processing a regular request step 305 in the method in FIG. 3 for generating an onboarding flow for an application according to one embodiment.

If the on-boarding server 30 determines at Block 304 that there is no request for a change in payment choice, the on-boarding server 30 processes a regular request at Block 305. FIG. 5 illustrates a flow diagram of an example method for the processing a regular request step 305 in the method in FIG. 3 for generating an onboarding flow for an application according to one embodiment. At Block 501, the on-boarding server 30 may signal to the user's electronic device 10 or to the third-party application server 35 to allow access to the application to the user. The user may then access the service associated with the application. For example, in the ridesharing application example, the user may request a ride using the application. At Block 502, the on-boarding server 30 completes a transaction with the application by processing the default payment information previously stored and associated with the user in the storage 31.

Figure 6:
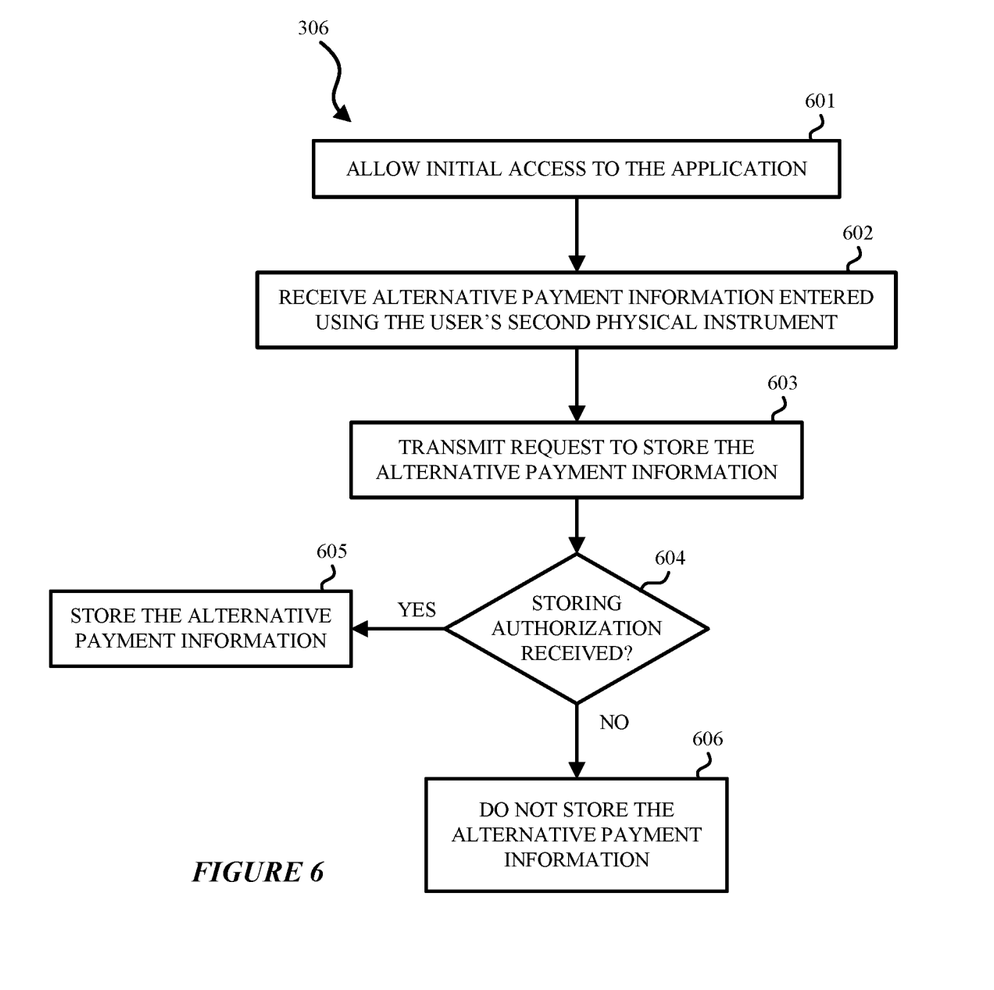
FIG. 6 illustrates a flow diagram of an example method for the processing a change in payment request step 305 in the method in FIG. 3 for generating an onboarding flow for an application according to one embodiment.

Referring back to FIG. 3, if the on-boarding server 30 determines at Block 304 that there is a request for a change in payment choice, the on-boarding server 30 processes a change in payment request at Block 306. FIG. 6 illustrates a flow diagram of an example method for the processing a change in payment request step 305 in the method in FIG. 3 for generating an onboarding flow for an application according to one embodiment. At Block 601, the on-boarding server 30 signals to the user's electronic device 10 or to the third-party application server 35 to allow the initial access to the application to the user.

Similar to Block 407 in FIG. 4, at Block 601, the on-boarding server 30 signals to allow initial access by signaling that the user requires access to payment processing hardware to process the user's alternative physical payment instrument (e.g., a business payment card). In one embodiment, the on-boarding server 30 may signal to the third-party application server 35 or to the user's electronic device 10 that the user requires access to payment processing hardware 40. At Block 601, the user is able to request the service associated with the application from a provider who has access to payment processing hardware 40 on their provider's electronic device 45 in order to pay for the service by using an alternative physical payment instrument with the payment processing hardware 40. The payment information associated with the user's alternative physical payment instrument (e.g., a credit or debit card) is an alternative payment information. The alternative payment information may include the alternative payment card number, alternative payment card expiration number, billing address associated with the alternative payment card, etc.

At Block 602, the on-boarding server 30 may receive the alternative payment information entered using the payment processing hardware 40 to process a user's alternative (or second) physical payment instrument.

At Block 603, the on-boarding server 30 may transmit a request to store the alternative payment information. For example, the on-boarding server 30 may transmit a signal to the user's electronic device 10 to display the request to store the alternative payment information as a notification to the user. At Block 604, the on-boarding server 30 determines whether an authorization to store the alternative payment information is received from the user's electronic device 10. The on-boarding server 30 stores the alternative payment information at Block 605 if the authorization is received at Block 604. If no authorization is received at Block 604, at Block 606, the on-boarding server 30 does not store the alternative payment information.

In one embodiment, the on-boarding server 30 determines that the user's default payment instrument is not longer valid. For instance, the on-boarding server 30 may determine that the payment instrument has expired or has recently been declined (or blacklisted). In this embodiment, the on-boarding server 30 may signal to the user's electronic device 10 to display a notification to the user that the default payment instrument is no longer valid. The on-boarding server 30 may then also signal to allow initial access to the application in order for the user to provide a new valid payment instrument using a payment processing hardware 40. Thus, the initial access to the application will allow the user to have access to a provider that has a provider's electronic device 45 with payment processing hardware 40 to process a user's physical payment instrument. Once the user's new physical payment instrument is processed, the on-boarding server 30 receives and stores a new default payment information.

Figure 8:
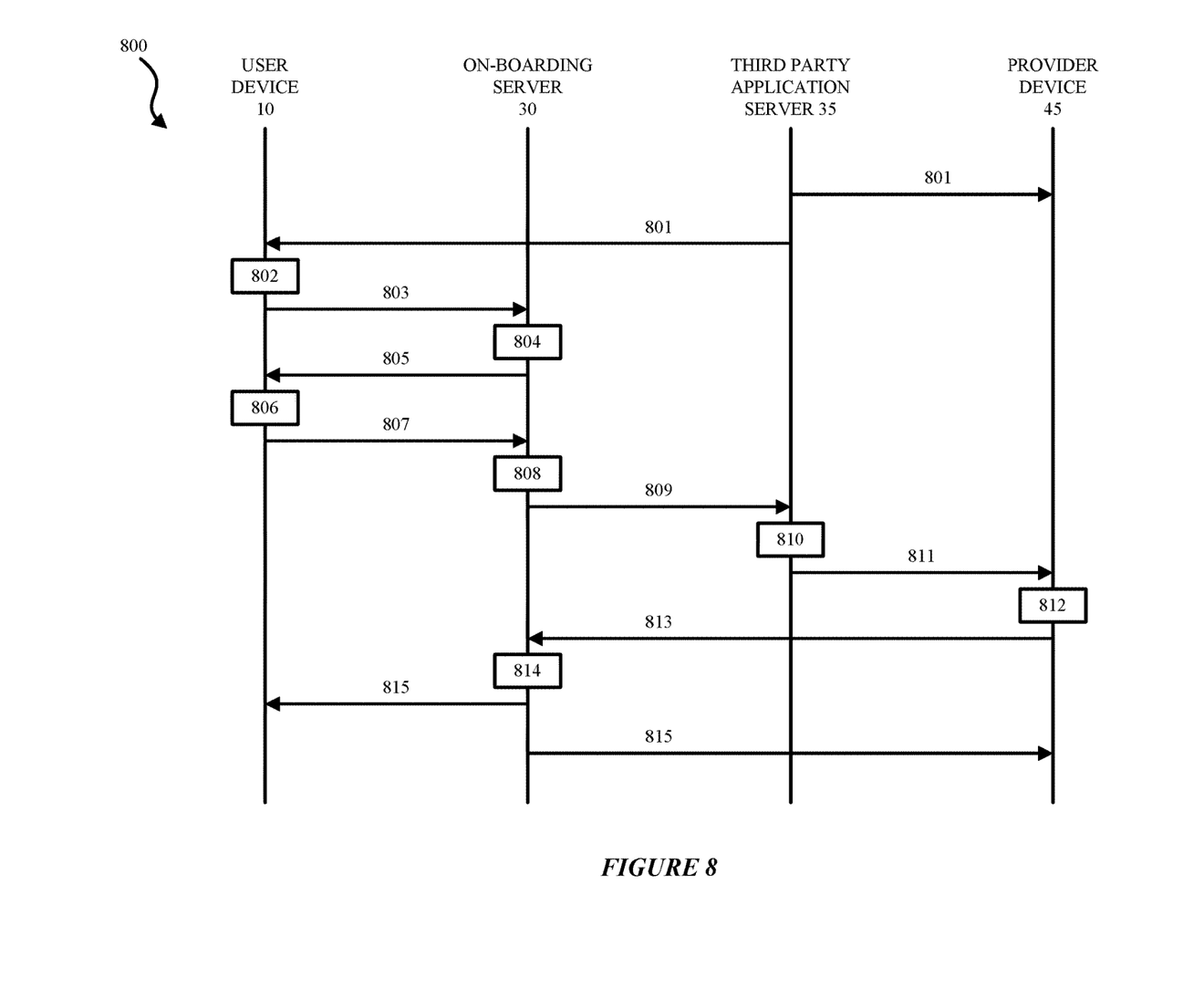
FIG. 8 illustrates a sequence diagram of an example method for generating an onboarding flow for an application according to one embodiment.

FIG. 8 illustrates a sequence diagram of an example method for generating an onboarding flow for an application according to one embodiment. The method 800 starts with a third party application server 35 transmitting the application to the user's electronic device 10 and to the provider's electronic device 45 at Block 801 and the user's electronic device 10 downloads and installs the application from the third party server 35 at Block 802.

At Block 803, the user's electronic device 10 transmits a request to the on-boarding server 30. At Block 804, the on-boarding server 30 receives the request and determines whether the request is an initial request. The request is determined to be the initial request when a minimal set of information associated with the user is not stored in the on-boarding server 30. When the request is determined to be the initial request, the on-boarding server 30 transmits a signal to the user's electronic device 10 at Block 805 to display a request for the minimal set of information associated with the user. At Block 806, the user's electronic device receives the signal from the on-boarding server 30 and displays the request for the minimal set of information associated with the user. For example, the user's electronic device 10 may display the user interface display 901 in FIG. 9.

At Block 807, the user's electronic device 10 transmits to the on-boarding server 30 the minimal set of information associated with the user which is stored by the on-boarding server in storage 31 at Block 808. At Block 809, the on-boarding server 30 signals to the third party application server 35 to allow initial access to the application. At Block 810, the third-party application receives the signal from the on-boarding server 30 to allow initial access to the application and at Block 811, signals to the provider device 45 that an initial access to the application is requested. For example, the provide device 45 includes the payment processing hardware to process a user's physical payment instrument such that the provider device 45 is being signaled indicate that the user requires access to payment processing hardware 45. At the beginning or at the completion of the service, at Block 812, the provider's electronic device 45 may use the payment processing hardware 40 to process a user's physical payment instrument and thus, obtain a default payment information entered using the payment processing hardware 40. At Block 813, the provider's electronic device 45 transmits the default payment information to the on-boarding server 30 which stores the default payment information in the storage 31 at Block 814. At Block 815, the on-boarding server 30 signals to the user's electronic device 10 to display a notice that the default payment information has been stored and a notice that the transaction is successfully completed. At Block 815, the on-boarding server 30 also signals to the provider's electronic device 45 to display a notice that the transaction is successfully completed.

Figure 7:
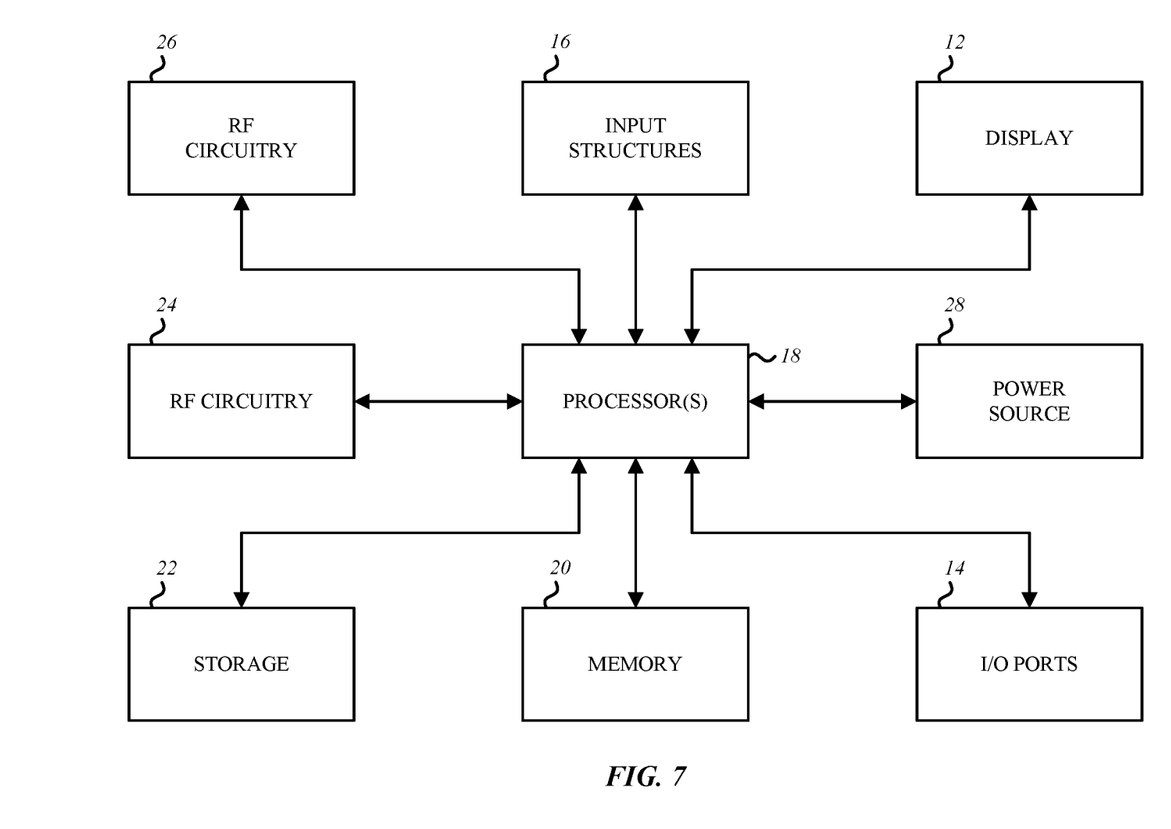
FIG. 7 is a block diagram of exemplary components of a mobile device included in the system in FIG. 1 for generating an onboarding flow for an application in accordance with aspects of the present disclosure.

FIG. 7 is a block diagram of exemplary components of a user's electronic device 10 or a provider's electronic device 45 included in the system 10 in FIG. 1 for generating an onboarding flow for an application in accordance with aspects of the present disclosure. Specifically, FIG. 7 is a block diagram depicting various components that may be present in electronic devices suitable for use with the present techniques. The electronic devices 10 and 45 may be a mobile device or a stationary device. The electronic devices 10 and 45 may be in the form of a computer, a handheld portable electronic device such as a cellular phone, a mobile device, a personal data organizer, a computing device having a tablet-style form factor, etc. These types of electronic devices, as well as other electronic devices providing comparable voice communications capabilities (e.g., VoIP, telephone communications, etc.), may be used in conjunction with the present techniques.

Keeping the above points in mind, FIG. 7 is a block diagram illustrating components that may be present in one such electronic device 10 or 45, and which may allow the device 10 or 45 to function in accordance with the techniques discussed herein. The various functional blocks shown in FIG. 7 may include hardware elements (including circuitry), software elements (including computer code stored on a computer-readable medium, such as a hard drive or system memory), or a combination of both hardware and software elements. It should be noted that FIG. 7 is merely one example of a particular implementation and is merely intended to illustrate the types of components that may be present in the electronic device 10 or 45. For example, in the illustrated embodiment, these components may include a display 12, input/output (I/O) ports 14, input structures 16, one or more processors 18, memory device(s) 20, non-volatile storage 22, expansion card(s) 24, RF circuitry 26, and power source 28.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention claimed is:

1. A method for onboarding an application enabling a user to access services and/or service providers associated with a third party application server using the application, the method comprising:
   receiving, by an on-boarding server, a request from an electronic device associated with the user to activate the application;
   determining, by the on-boarding server, whether the request is an initial request when a minimal set of information associated with the user is not stored in a memory of the on-boarding server; and
   when the request is determined to be the initial request,
      transmitting a first signal, by a communications interface of the on-boarding server, to the electronic device causing the electronic device to display a graphical user interface for a request for the minimal set of information associated with the user, wherein the minimal set of information includes at least one of: a user identification, a device identification, a legal name, a phone number, or an email address,
      receiving, by the communications interface of the on-boarding server, the minimal set of information associated with the user from data entered by the user in the graphical user interface,
      storing, in the memory of the on-boarding server, the minimal set of information associated with the user,
      determining, by the on-boarding server, a risk associated with the user based on the minimal set of information,
      when the risk associated with the user is greater than a predetermined threshold, transmitting a second signal, by the communications interface of the on-boarding server, to the electronic device causing the electronic device to display a second graphical user interface for a request for additional information associated with the user,
      in response to receiving and storing in the memory the additional information associated with the user, transmitting a third signal, by the communications interface of the on-boarding server, to the third party application server to allow the user initial access to the application, wherein transmission of the third signal to allow the user an initial access causes the third party application server to transmit a fourth signal to at least one application provider device activating one or more readers of payment processing hardware to provide user access for capturing payment information from a user's physical payment instrument,
      receiving, by the communications interface of the on-boarding server, a default payment information captured by the payment processing hardware to process a user's first physical payment instrument, and
      storing, in the memory of the on-boarding server, the default payment information in the on-boarding server.

2. The method of claim 1, wherein determining the risk associated with the user is further based on information associated with the user's electronic device comprising one or more of a brand, a carrier, a unique identification number, a globally unique identifier, an identification of one or more applications installed on the electronic device, a purchase history associated with the electronic device, and a determination of whether the electronic device is rooted.

3. The method of claim 1, wherein the additional information associated with the user includes at least one of: social network access information, home address, telephone number, or payment information.

4. The method of claim 1, wherein calculating the risk associated with the user is further based on information processed in the user's initial access to the application.

5. The method of claim 1, further comprising:
   tokenizing the user's first physical payment instrument,
   associating the default payment information with the user in the application, and
   completing a transaction with the application using the default payment information.

6. The method of claim 1, further comprising:
   once the default payment information that is entered using the payment processing hardware is received, determining whether the default payment information has previously been associated with an authorization to complete automatic on-boarding for the application using previously stored user personal information on the on-boarding server.

7. The method of claim 1, further comprising:
   determining whether there is request for a change in payment choice, wherein when the request for the change in payment choice is determined,
   signaling by the on-boarding server to allow the initial access to the application, and
   receiving by the on-boarding server an alternative payment information entered using the payment processing hardware to process a user's second physical payment instrument.

8. The method of claim 1, further comprising:
   when the request is determined to not be the initial request, signaling by the on-boarding server to allow access to the application, and completing a transaction with the application by processing the default payment information previously stored and associated with the user.

9. The method of claim 1, further comprising:

determining whether there is request for a change in payment choice, wherein when the request for the change in payment choice is determined, signaling by the on-boarding server to allow the initial access to the application, and receiving by the on-boarding server an alternative payment information entered using the payment processing hardware to process a user's second physical payment instrument.

10. The method of claim 1, wherein the third party application server comprises the onboarding server.

11. A non-transitory computer-readable storage medium having stored thereon instructions that, when executed by a processor, cause the processor to perform a method for onboarding an application enabling a user to access services and/or service providers associated with a third party application server using the application, the method comprising:

receiving, by an on-boarding server, a request from an electronic device associated with the user to activate the application;

determining, by the on-boarding server, whether the request is an initial request when a minimal set of information associated with the user is not stored in a memory of the on-boarding server; and when the request is determined to be the initial request, transmitting a first signal, by a communications interface of the on-boarding server, to the electronic device causing the electronic device to display a graphical user interface for a request for the minimal set of information associated with the user, wherein the minimal set of information includes at least one of: a user identification, a device identification, a legal name, a phone number, or an email address, receiving, by the communications interface of the on-boarding server, the minimal set of information associated with the user from data entered by the user in the graphical user interface, storing, in the memory of the on-boarding server, the minimal set of information associated with the user, determining, by the on-boarding server, a risk associated with the user based on the minimal set of information, when the risk associated with the user is greater than a predetermined threshold, transmitting a second signal, by the communications interface of the on-boarding server, to the electronic device causing the electronic device to display a second graphical user interface for a request for additional information associated with the user, in response to receiving and storing in the memory the additional information associated with the user, transmitting a third signal, by the communications interface of the on-boarding server, to the third party application server to allow the user initial access to the application, wherein transmission of the third signal to allow the user an initial access causes the third party application server to transmit a fourth signal to at least one application provider device activating one or more readers of payment processing hardware to provide user access for capturing payment information from a user's physical payment instrument, receiving, by the communications interface of the on-boarding server, a default payment information captured by the payment processing hardware to process a user's first physical payment instrument, and storing in the memory of the on-boarding server, the default payment information in the on-boarding server.

12. The non-transitory computer-readable storage medium of claim 11, wherein determining the risk associated with the user is further based on information associated with the user's electronic device comprising one or more of a brand, a carrier, a unique identification number, a globally unique identifier, an identification of one or more applications installed on the electronic device, a purchase history associated with the electronic device, and a determination of whether the electronic device is rooted.

13. The non-transitory computer-readable storage medium of claim 11, wherein the additional information associated with the user includes at least one of: social network access information, home address, telephone number, or payment information.

14. The non-transitory computer-readable storage medium of claim 11, wherein calculating the risk associated with the user is further based on information processed in the user's initial access to the application.

15. The non-transitory computer-readable storage medium of claim 11, further comprising:

tokenizing the user's first physical payment instrument, associating the default payment information with the user in the application, and completing a transaction with the application using the default payment information.

16. The non-transitory computer-readable storage medium of claim 11, further comprising:

once the default payment information that is entered using the payment processing hardware is received, determining whether the default payment information has previously been associated with an authorization to complete automatic on-boarding for the application using previously stored user personal information on the on-boarding server.

17. The non-transitory computer-readable storage medium of claim 11, further comprising:

determining whether there is request for a change in payment choice, wherein when the request for the change in payment choice is determined, signaling by the on-boarding server to allow the initial access to the application, and receiving by the on-boarding server an alternative payment information entered using the payment processing hardware to process a user's second physical payment instrument.

18. The non-transitory computer-readable storage medium of claim 11, further comprising:

when the request is determined to not be the initial request, signaling by the on-boarding server to allow access to the application, and completing a transaction with the application by processing the default payment information previously stored and associated with the user.

19. The non-transitory computer-readable storage medium of claim 11, further comprising:

determining whether there is request for a change in payment choice, wherein when the request for the change in payment choice is determined,
  signaling by the on-boarding server to allow the initial access to the application, and
  receiving by the on-boarding server an alternative payment information entered using the payment processing hardware to process a user's second physical payment instrument.

20. The non-transitory computer-readable storage medium of claim 11, wherein the third party application server comprises the onboarding server.

21. A system to onboard an application enabling a user to access services and/or service providers associated with a third party application server using the application, comprising:
  an on-boarding server communicatively coupled to an electronic device having the application implemented thereon, wherein the electronic device is associated with the user, wherein the on-boarding server comprises:
  a storage to store the minimal set of information associated with the user, and a default payment information entered using a payment processing hardware to process a user's first physical payment instrument, and
  a processor of the on-boarding server coupled to the storage, the processor to:
    determine whether the request is an initial request when a minimal set of information associated with the user is not stored in a memory of the on-boarding server,
    when the request is determined to be the initial request, the processor to:
      transmit a first signal, using a communications interface of the on-boarding server, to the electronic device causing the electronic device to display a graphical user interface for a request for the minimal set of information associated with the user, wherein the minimal set of information includes at least one of: a user identification, a device identification, a legal name, a phone number, or an email address,
      receive, by the communications interface of the on-boarding server, the minimal set of information associated with the user from data entered by the user in the graphical user interface,
      store, in the storage of the on-boarding server, the minimal set of information associated with the user,
      determine a risk associated with the user based on the minimal set of information,
      when the risk associated with the user is greater than a predetermined threshold, transmit a second signal, using the communications interface of the on-boarding server, to the electronic device causing the electronic device to display a second graphical user interface for a request for additional information associated with the user,
      in response to receipt and storage of the additional information associated with the user, transmit a third signal, using the communications interface, to the third party application server to allow the user initial access to the application, wherein transmission of the signal to allow the user an initial access causes the third party application server to transmit a fourth signal to at least one application provider device activating one or more readers of payment processing hardware to provide user access for capturing payment information from a user's physical payment instrument,
      receive, using the communications interface, a default payment information captured by the payment processing hardware to process a user's first physical payment instrument, and
      store, in the storage, the default payment information in the on-boarding server.

22. The system of claim 21, wherein the processor further bases the determination of the risk on information associated with the user's electronic device comprising one or more of a brand, a carrier, a unique identification number, a globally unique identifier, an identification of one or more applications installed on the electronic device, a purchase history associated with the electronic device, and a determination of whether the electronic device is rooted.

* * * * *